US 8,296,588 B2

(12) United States Patent
Nakano

(10) Patent No.: US 8,296,588 B2
(45) Date of Patent: Oct. 23, 2012

(54) MICROCONTROLLER AND CONTROL METHOD THEREFOR

(75) Inventor: Masataka Nakano, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 1060 days.

(21) Appl. No.: 12/216,769

(22) Filed: Jul. 10, 2008

(65) Prior Publication Data

US 2009/0037755 A1 Feb. 5, 2009

(30) Foreign Application Priority Data

Aug. 2, 2007 (JP) ................................. 2007-201809

(51) Int. Cl.
G06F 1/00 (2006.01)
G06F 1/26 (2006.01)
(52) U.S. Cl. .......................... 713/300; 713/500; 713/340
(58) Field of Classification Search .................. 713/300, 713/322, 324, 340, 500
See application file for complete search history.

(56) References Cited

U.S. PATENT DOCUMENTS

| | | | |
|---|---|---|---|
| 5,696,950 A * | 12/1997 | Ichinose et al. | 713/501 |
| 5,715,465 A * | 2/1998 | Savage et al. | 713/340 |
| 6,404,081 B1 * | 6/2002 | Staffiere | 307/130 |
| 6,556,901 B2 * | 4/2003 | Sugimura et al. | 701/29 |
| 7,174,392 B2 * | 2/2007 | Tervo | 709/248 |
| RE40,473 E * | 8/2008 | Osborn et al. | 713/300 |
| 7,516,339 B2 * | 4/2009 | Gottlieb | 713/300 |
| 7,603,643 B2 * | 10/2009 | McCracken et al. | 716/100 |
| 7,640,424 B2 * | 12/2009 | Conley | 713/1 |
| 7,728,459 B2 * | 6/2010 | Lou et al. | 307/66 |
| 2003/0122524 A1 * | 7/2003 | Rhee et al. | 320/128 |
| 2004/0073807 A1 * | 4/2004 | Youssef | 713/194 |
| 2005/0268127 A1 * | 12/2005 | Shiba et al. | 713/320 |
| 2006/0005054 A1 * | 1/2006 | Fernald et al. | 713/300 |

FOREIGN PATENT DOCUMENTS

| | | |
|---|---|---|
| JP | 63-268058 A | 11/1988 |
| JP | 2001-228932 A | 8/2001 |
| JP | 2002-222030 A | 8/2002 |
| JP | 2002-354707 A | 12/2002 |
| JP | 2006-79332 | 3/2006 |

OTHER PUBLICATIONS

JP 2002222030 Translation, "Portable Electronic Equipment", Susumu Suzuki, Aug. 2002.* Chinese Office Action dated Apr. 25, 2011, with English translation.
Notification of Notice of Reasons for Rejection dated Feb. 1, 2011, with English translation.
Notice of Reasons for Rejection dated Jan. 10, 2012 (with a partial English translation), for Application No. 2007-201809.

* cited by examiner

*Primary Examiner* — Paul R Myers
*Assistant Examiner* — Trisha Vu
(74) *Attorney, Agent, or Firm* — McGinn IP Law Group, PLLC

(57) ABSTRACT

Provided is a microcontroller including: a first low-voltage detection circuit to detect that a power supply voltage is equal to or lower than a first voltage value; a second low-voltage detection circuit to detect that the power supply voltage is equal to or lower than a second voltage value, the second voltage value being lower than the first voltage value; a CPU to stop operating when the first low-voltage detection circuit detects that the power supply voltage is equal to or lower than the first voltage value; and a real-time clock to continue operating unless the second low-voltage detection circuit detects that the power supply voltage is equal to or lower than the second voltage value, in which the first low-voltage detection circuit, the second low-voltage detection circuit, the CPU, and the real-time clock are formed on a single chip.

17 Claims, 6 Drawing Sheets

MICROCONTROLLER AND CONTROL METHOD THEREFOR

BACKGROUND OF THE INVENTION

1. Field of the Invention

The present invention relates to a microcontroller.

2. Description of Related Art

In recent years, various electronic devices such as home appliances are provided with a clock function for displaying date and time, for example. In general, the clock function is achieved when a counter value of a real-time clock (RTC), which is provided in a microcontroller for controlling a device, is read by a CPU that is also provided in the microcontroller.

However, when a main battery or an AC power supply for supplying power to a device is disconnected, or when a voltage supplied from a battery drops, for example, the clock function is reset and forced to stop operating. As a result, in a case where a user or a system of the device uses the clock function again, it is necessary for the user to set time information each time the clock function is reset.

Such a problem arises for the following reason. That is, conventionally, a microcontroller for controlling a device is designed mainly focusing on a central processing unit (CPU) provided therein. Accordingly, in order to prevent runaway of a microcontroller due to a drop in power supply voltage, the microcontroller is designed such that the whole microcontroller is reset and deactivated at about a minimum operation guarantee voltage of the CPU. Further, a reason why the microcontroller is designed focusing on the CPU provided therein is as follows. That is, operations of peripheral functions provided in the microcontroller are controlled in response to signals from the CPU, and values obtained in the peripheral functions are processed by the CPU. Accordingly, when the CPU is reset, the operations of the peripheral functions cannot be controlled and the values obtained in the peripheral functions cannot be used.

As an example of prior art, FIG. 6 shows the configuration of a hardware block such as a microcontroller disclosed in Japanese Unexamined Patent Application Publication No. 2006-79332 (hereinafter, referred to as "prior art"). In the prior art, a reset signal from a reset circuit 540, which receives the reset signal from a reset terminal, is connected to an RTC 560, a CPU 510, and other peripheral functions via a bus. In general, as described above, when the power supply voltage drops, it is necessary to reset the microcontroller at about the minimum operation guarantee voltage of the CPU in order to prevent the runaway of the CPU. As a result, the reset signal from the reset circuit 540 of the prior art is also applied to the whole microcontroller.

In this case, in general, if the microcontroller is not reset as described above, the real-time clock can operate at a voltage lower than that for operating the CPU. This is because, in the operation of the CPU, it is necessary to cause a charge pump and a sense amplifier to operate in a case of reading/writing data from a memory such as a flash read only memory (ROM) or a random access memory (RAM), with the result that a voltage higher than that used only by a logic circuit provided in the CPU is required. On the other hand, the real-time clock formed only with a logic circuit can operate at a lower voltage.

However, the whole microcontroller is reset as described above, so the real-time clock capable of normally operating at a lower voltage is also reset. This is because, as described above, the conventional microcontroller is designed focusing on the CPU. Thus, when a main battery or an AC power supply is disconnected, or when a voltage supply capacity of a battery is lowered, for example, the clock function associated with the real-time clock is also reset. Accordingly, in the case where the user or the system of the device uses the clock function again, it is necessary for the user to set time information again each time the clock function is reset. As a result, user-friendliness in using the device having the microcontroller is impaired.

Further, in case the main power supply is disconnected, or in case the power supply capacity of the battery is lowered, for example, there is provided a device having a charged capacitance used as a backup standby power supply to drive a microcontroller. However, an output voltage drops during a process in which the capacitance is discharged. When the output voltage from the capacitance is reduced to about the minimum operation guarantee voltage of the CPU provided in the microcontroller, even if an electric charge is left in the capacitance, the whole microcontroller is reset.

In this case, in order to operate the RTC at a lower voltage, it is necessary to prepare an external RTC separate from the microcontroller. As a result, it is necessary to prepare another chip, which leads to an increase in manufacturing costs due to an increase in substrate area, an increase in the number of manufacturing processes, and the like.

In view of the foregoing, in order to prevent the increase in manufacturing costs without impairing the user-friendliness, there is a demand for operating a real-time clock for a longer period of time at a lower voltage in a one-chip microcontroller.

In the prior art, the clock function of the real-time clock provided in the microcontroller cannot operate continuously at low voltage. Accordingly, the clock function is reset each time the operation of the CPU mounted on the same chip is reset.

SUMMARY

In one embodiment of the present invention, there is provided a microcontroller including: a first low-voltage detection circuit to detect that a power supply voltage is equal to or lower than a first voltage value; a second low-voltage detection circuit to detect that the power supply voltage is equal to or lower than a second voltage value, the second voltage value being lower than the first voltage value; a CPU to stop operating when the first low-voltage detection circuit detects that the power supply voltage is equal to or lower than the first voltage value; and a real-time clock to continue operating unless the second low-voltage detection circuit detects that the power supply voltage is equal to or lower than the second voltage value, in which the first low-voltage detection circuit, the second low-voltage detection circuit, the CPU, and the real-time clock are formed on a single chip.

In another embodiment of the present invention, there is provided a control method for a microcontroller, the microcontroller including: a CPU; a clock unit; and a memory unit to store information indicative of an operation state of the clock unit, which are formed on a single chip, the method including: setting time information to the clock unit and setting a first value to the memory unit; detecting whether a power supply voltage is equal to or lower than a first voltage value; detecting whether the power supply voltage is equal to or lower than a second voltage value, the second voltage value being lower than the first voltage value; causing the CPU to stop operating and causing the clock unit to continue operating when the power supply voltage is detected to be equal to or lower than the first voltage value; and setting a second value to the memory unit when the power supply voltage is detected to be equal to or lower than the second voltage value.

In the microcontroller according to the present invention, even of the power supply voltage becomes equal to or lower than the first voltage value and the CPU provided in the microcontroller is reset and deactivated, the real-time clock is not stopped unless the power supply voltage becomes equal to or lower than the second voltage value that is lower than the first voltage value.

According to the present invention, even if the power supply voltage drops and the CPU is reset, the real-time clock is not reset. Consequently, it is unnecessary to set the time function again.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF THE PREFERRED EMBODIMENTS

The invention will now be described herein with reference to illustrative embodiments. Those skilled in the art will recognize that many alternative embodiments can be accomplished using the teachings of the present invention and that the invention is not limited to the embodiments illustrated for explanatory purposes.

First Embodiment

Figure 1:
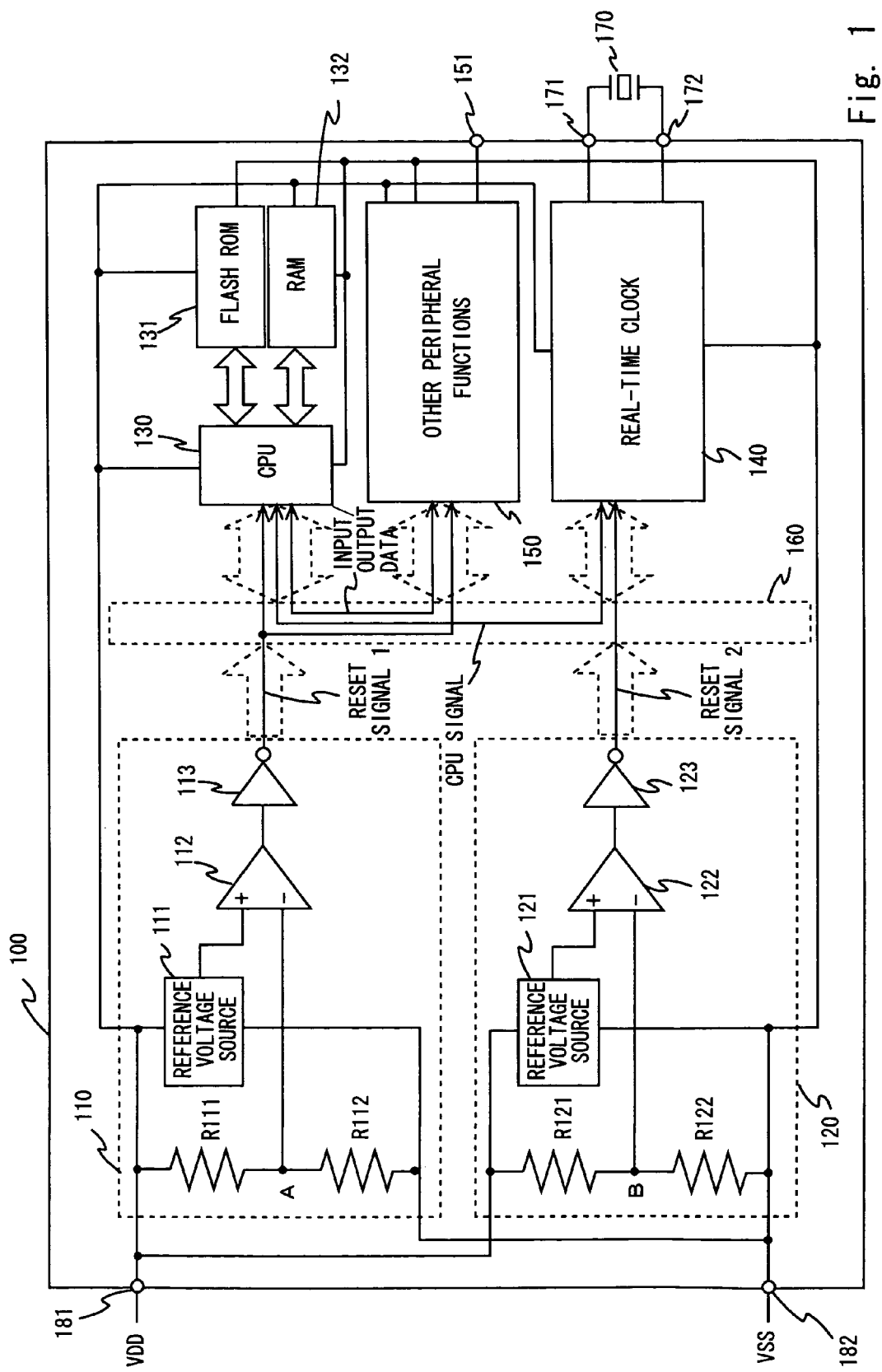
FIG. 1 shows an example of the configuration of a microcontroller according to an embodiment of the present invention.

Hereinafter, specific embodiments to which the present invention is applied will be described in detail with reference to the drawings. FIG. 1 shows an example of the configuration of a microcontroller 100 according to a first embodiment of the present invention.

The microcontroller 100 includes a low-voltage detection circuit 110, a low-voltage detection circuit 120, a CPU 130, a flash ROM 131, a RAM 132, a real-time clock 140, other peripheral functions 150, and an internal bus 160, which are formed on a single chip. Further, the microcontroller 100 includes a high-potential side power supply voltage terminal 181, a low-potential side power supply voltage terminal 182, external terminals 171 and 172, and a data input/output terminal 151. The high-potential side power supply voltage terminal 181 and the low-potential side power supply voltage terminal 182 supply a power supply voltage VDD and a voltage VSS at GND level, respectively. The external terminals 171 and 172 are connected with a quartz-crystal oscillator 170. The data input/output terminal 151 inputs data set by a user and outputs display data sent from the CPU 130 to be displayed on an external display, for example.

The low-voltage detection circuit 110 (first low-voltage detection circuit) includes resistor elements R111 and R112, a reference voltage source 111, a comparator 112, and an inverter 113. The resistor elements R111 and R112 are connected in series between the high-potential side power supply voltage terminal 181 and the low-potential side power supply voltage terminal 182. The reference voltage source 111 is connected in parallel with the resistor elements R111 and R112. The comparator 112 has a non-inverting terminal for receiving a voltage at a node A between the resistor elements R111 and R112, and has an inverting terminal for receiving an output voltage of the reference voltage source 111. The inverter 113 inverts and amplifies an output of the comparator 112.

In this case, the voltage at the node A between the resistor elements R111 and R112 is a voltage obtained by dividing a difference between a voltage at the high-potential side power supply voltage terminal 181 (hereinafter, referred to as "VDD") and a voltage at the low-potential side power supply voltage terminal 182 (hereinafter, referred to as "VSS"), as apparent from the circuit configuration. For example, assuming that the resistor elements R111 and R112 have the same resistance value, when the VDD is 2.0 V, a voltage of 1.0 V appears at the node A. Note that the resistance values of the resistor elements R111 and R112 may be varied depending on the circuit configuration.

Further, the reference voltage source 111 is formed of a regulator or the like, and outputs a predetermined voltage. In this case, the predetermined voltage output by the reference voltage source 111 is set to be equal to the voltage that appears at the node A when the VDD is equal to a minimum operation guarantee voltage for operating the CPU 130 and the other peripheral functions 150. The minimum operation guarantee voltage for operating the CPU 130 and the other peripheral functions 150 is referred to as a detection voltage 1 (first voltage value). Thus, when the voltage at the node A is higher than the output voltage of the reference voltage source 111, the comparator 112 outputs a high-level signal, and when the voltage at the node A is lower than the output voltage of the reference voltage source 111, the comparator 112 outputs a low-level signal.

Further, in this case, a logical signal output by the inverter 113 is input as a reset signal 1 to the CPU 130 and the other peripheral functions 150 via the internal bus 160. When the reset signal 1 is a low-level signal, the reset signal 1 is enabled to reset functions such as a CPU provided in the microcontroller and stop operations thereof.

The low-voltage detection circuit 120 (second low-voltage detection circuit) includes resistor elements R121 and R122, a reference voltage source 121, a comparator 122, and an inverter 123. The resistor elements R121 and R122 are connected in series between the high-potential side power supply voltage terminal 181 and the low-potential side power supply voltage terminal 182. The reference voltage source 121 is connected in parallel with the resistor elements R121 and R122. The comparator 122 has a non-inverting terminal for receiving a voltage at a node B between the resistor elements R121 and R122, and has an inverting terminal for receiving an output voltage of the reference voltage source 121. The inverter 123 inverts and amplifies an output of the comparator 122.

In this case, as in the case of the reference voltage source 111, the voltage at the node B between the resistor elements R121 and R122 is a voltage obtained by dividing a difference between the VDD and the VSS. Further, the resistance values of the resistor elements R121 and R122 may be varied depending on the circuit configuration.

The reference voltage source 121 is formed of a regulator or the like, and outputs a predetermined voltage lower than the voltage of the reference voltage source 111. In this case, the predetermined voltage output by the reference voltage source 121 is set to be equal to the voltage that appears at the node B when the VDD is equal to a minimum operation guarantee voltage of the real-time clock 140. The minimum operation guarantee voltage of the real-time clock 140 is referred to as a detection voltage 2 (second voltage value). Thus, when the voltage at the node B is higher than the output voltage of the reference voltage source 121, the comparator 122 outputs a high-level signal, and when the voltage at the node B is lower than the output voltage of the reference voltage source 121, the comparator 122 outputs a low-level signal.

Further, in this case, a logical signal output by the inverter 123 is input as a reset signal 2 to the real-time clock 140 via the internal bus 160. When the reset signal 2 is a low-level signal, the reset signal 2 is enabled to reset the real-time clock 140 and stop an operation thereof.

In this case, the low-voltage detection circuits 110 and 120 may be implemented using different configurations without adversely affecting the basic performance. For example, the CPU 130 and the like are configured to be reset when the reset signals 1 and 2 are low-level signals, but may be configured to be reset when the reset signals 1 and 2 are high-level signals. In such a case, an amplifier function or the like of the signals cannot be obtained, but the inverters 113 and 123 can be omitted. Further, as the power supply for each of the regulator which form the reference voltage sources 110 and 120, and the comparators 112 and 122, a power supply voltage different from the illustrated power supply voltage VDD can be used, for example. In this case, it is possible to use the reference voltage sources 110 and 120 for directly inputting the power supply voltage VDD to the inverting input terminals of the comparators 112 and 122 to output voltages equivalent to the minimum operation guarantee voltages of the CPU 130 and the real-time clock 140 to the non-inverting input terminals.

The real-time clock 140 includes a year counter, a month counter, a day counter, an hour counter, a minute counter, and a second counter to carry out a clock function and a calendar function. The real-time clock 140 counts oscillations of the quartz-crystal oscillator 170 or the like (ceramic oscillator may be employed when high accuracy is not required), to thereby update date and time automatically. When the reset signal 2 is input as a low-level signal, the real-time clock 140 is reset and deactivated.

Figure 2:
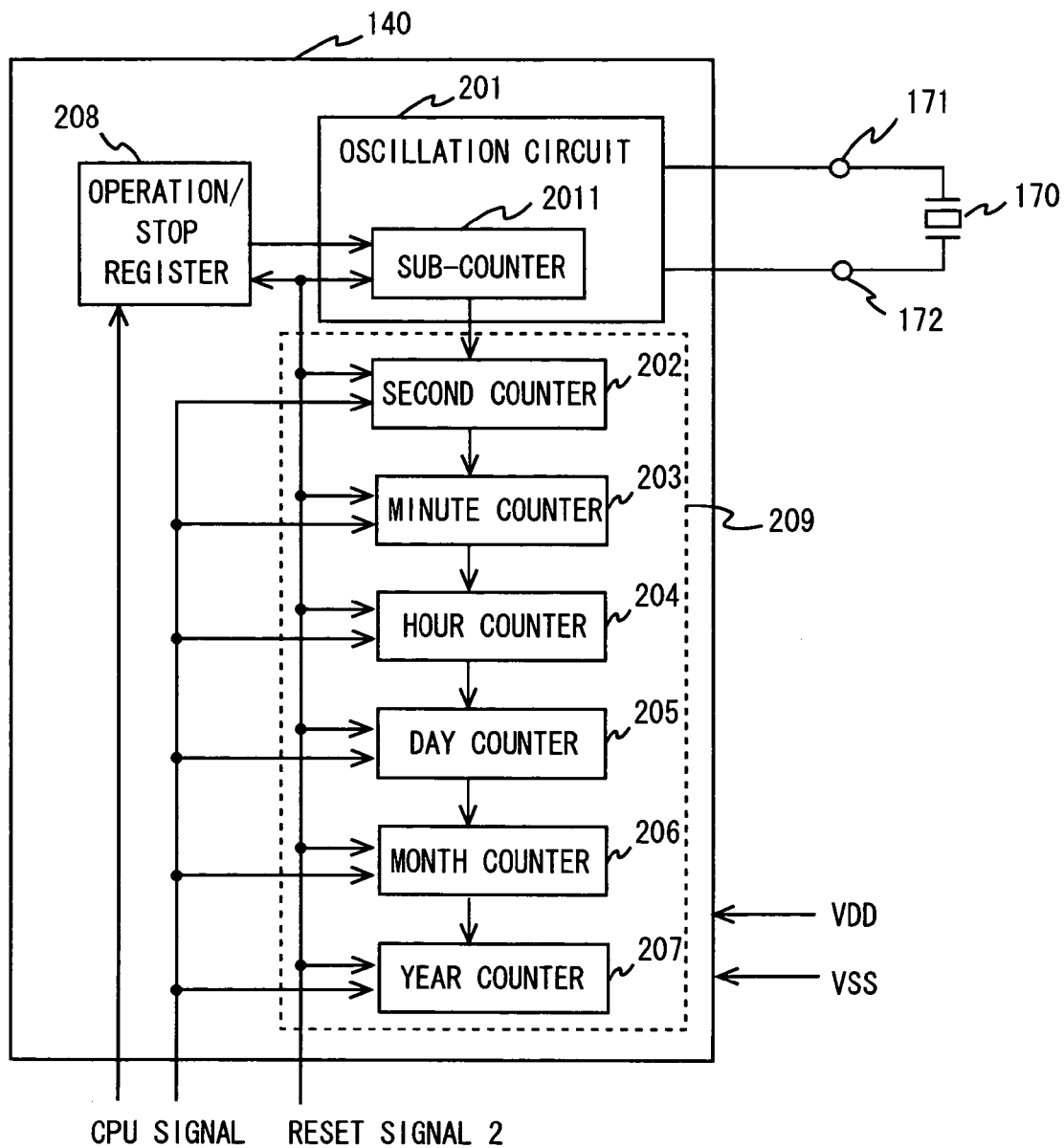
FIG. 2 shows an example of the configuration of a real-time clock according to the embodiment of the present invention.

FIG. 2 shows an example of the block configuration of the real-time clock 140. As shown in FIG. 2, the real-time clock 140 includes an oscillation circuit 201, a second counter 202, a minute counter 203, an hour counter 204, a day counter 205, a month counter 206, a year counter 207, and an operation/stop register 208. The oscillation circuit 201 includes a sub-counter 2011 provided therein. The second counter 202, the minute counter 203, the hour counter 204, the day counter 205, the month counter 206, and the year counter 207 form a time counter 209 (clock counter). The oscillation circuit 201 connects the quartz-crystal oscillator 170 to the external terminals 171 and 172. The sub-counter 2011 provided in the oscillation circuit 201 counts oscillation frequencies (for example, about 32 kHz) of the quartz-crystal oscillator externally connected, to thereby count one second. After counting one second, the sub-counter 2011 outputs a second count signal (clock signal) to the second counter 202.

The second counter 202 receives the second count signal from the sub-counter 2011, and counts one minute. After counting one minute, the second counter 202 outputs a minute count signal to the minute counter 203. After that, the minute counter 203, the hour counter 204, the day counter 205, the month counter 206, and the year counter 207 also perform an operation similar to that described above. The CPU performs such processing as reading of each value of the counters as a CPU signal to be output to an external display. In this case, when the reset signal 2 at the low level is input, each value of the counters of the real-time clock 140, and a value of the operation/stop register 208 are reset.

Further, when the real-time clock 140 is operating, the operation/stop register 208 holds a value of "1", and when the real-time clock 140 is stopped, the operation/stop register 208 holds a value of "0". The real-time clock 140 does not operate unless a user or the like performs time setting to set time information to each counter. Accordingly, the operation/stop register 208 holds the value "0". Then, after the time is set, the value of the operation/stop register 208 becomes "1", whereby the sub-counter 2011 operates. As a result, each of the counters starts operating. Setting of time setting data to each counter, and rewriting of the value of the operation/stop register 208 from "0" to "1" are performed in response to the CPU signal from the CPU 130.

The CPU 130 is a central control unit for performing various processing in a device based on control programs and input data. When the reset signal 1 is input at the low level, the CPU 130 is reset and deactivated.

In this case, the CPU 130 reads the value of the operation/stop register 208 provided in the real-time clock 140, as the CPU signal. When the read value of the operation/stop register 208 is "1", it is determined that the real-time clock 140 is operating. Then, each value of the counters is read to be displayed on the external display or to be used for time management in a device system. When the value of the operation/stop register 208 is "0", it is determined that the real-time clock 140 is stopped. Then, for example, message data prompting a user to set the time information again is transmitted to the external display via the data input/output terminal 151, and the contents of the message are displayed. Further, when the user performs the time setting, the time setting data is received via the data input/output terminal 151. Then, the received data is transmitted as the CPU signal to the real-time clock 140, and each value of the counters is set in accordance with the time setting data. After the time is set, the value of the operation/stop register 208 is rewritten from "0" to "1".

Further, the CPU 130 reads/writes data from/to the flash ROM 131 and the RAM 132. In the case of reading/writing data, it is necessary for the CPU 130 to cause a charge pump and a sense amplifier, which are provided in the CPU, to operate. Particularly when data is read from the flash ROM 131, a high voltage operation is required. In such an operation, the CPU 130 requires a voltage higher than that of the real-time clock 140, which results in an increase in minimum operation guarantee voltage.

The flash ROM 131 stores a control program, data, or the like for the CPU 130 to perform processing. The RAM 132 is a memory device used by the CPU 130 and the like. The control program, data, or the like read from the flash ROM 131 or the like is developed in the RAM 132.

The other peripheral functions 150 include a bus controller, a communication control circuit, a display driver, an A/D converter, a clock generator, and an input/output driver.

Among the functions, the input/output driver is connected with the data input/output terminal 151 and the internal bus 160. Further, the data input/output terminal 151 is connected with, for example, an external display and an input device such as a keyboard. Input/output data such as message data requesting set of time to be displayed on the external display, and time setting data set by a user with a keyboard, are input/output to/from the data input/output terminal 151.

When the reset signal 1 is input at the low level, the other peripheral functions 150 are reset and deactivated. The other peripheral functions 150 transmits/receives a control signal and data mainly to/from the CPU 130. When the CPU 130 is reset and deactivated in response to the reset signal 1, the transmission/reception of the control signal to/from the CPU 130 is impossible. Accordingly, it is appropriate to reset the other peripheral functions 150 as well as the CPU 130 at the same time to be brought into an operation stop state. Further, in order to prevent runaway of other peripheral functions 150 themselves due to a drop in the power supply voltage VDD, it is appropriate to reset the other functions 150 in response to the reset signal 1. On the other hand, the functions which do not necessarily perform the transmission/reception of the control signal or the like to/from the CPU 130, for example, and which can operate at a voltage lower than that for operating the CPU 130, may be reset and deactivated in response to the reset signal 2.

The internal bus 160 is a bus for transmitting signals between the components (CPU, real-time clock, and the like) forming the microcontroller 100. Through the internal bus 160, the reset signal 1 and the reset signal 2 are transmitted. The CPU signals, for example, time setting data from the CPU 130 to the real-time clock 140, time information from the real-time clock 140 to the CPU 130, register value information of the operation/stop register 208, and a reading/writing control signal are transmitted. The input/output data, for example, display message data for the external display and time setting data input by a use are transmitted.

Figure 3:
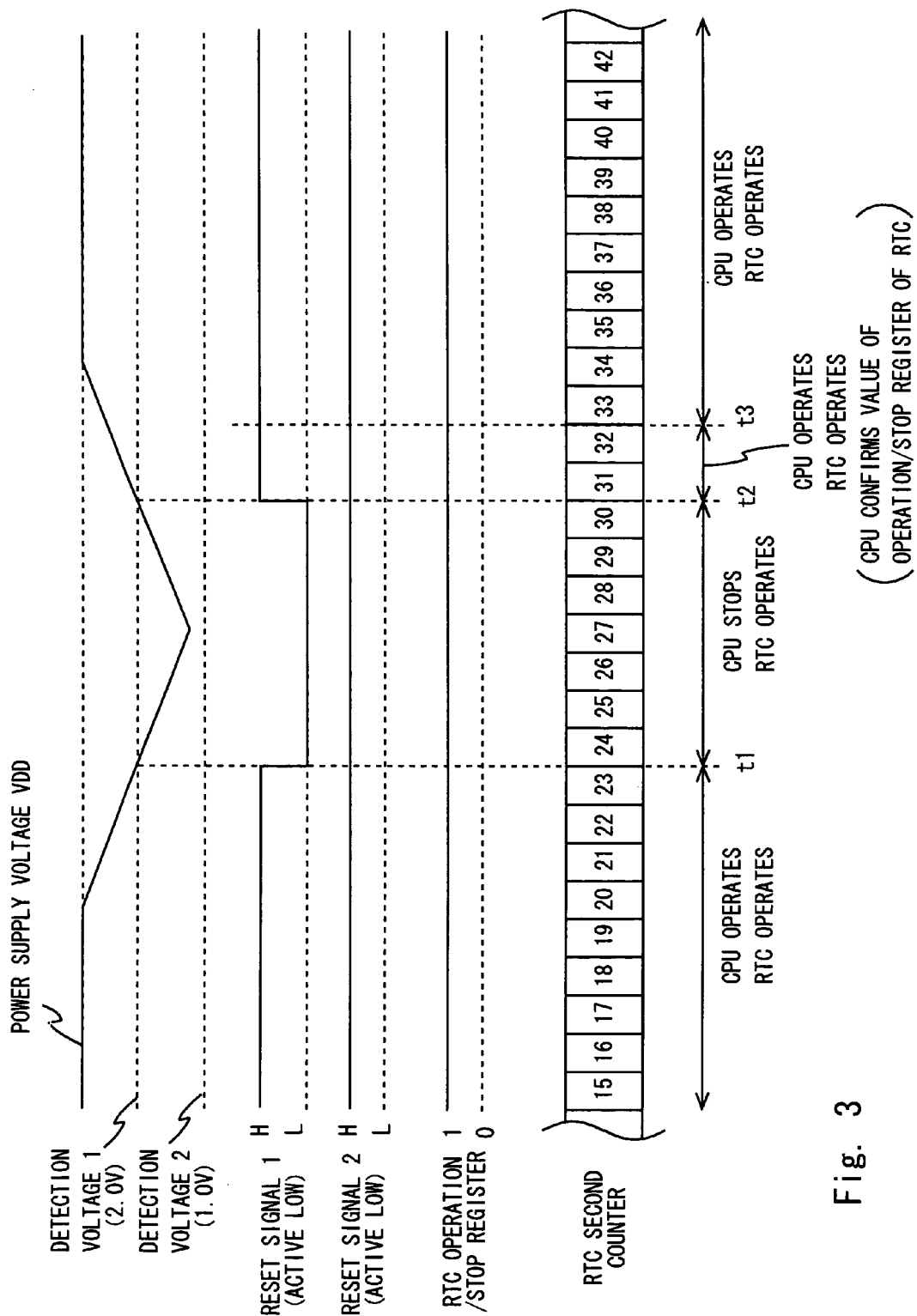
FIG. 3 shows an example of a timing chart of the microcontroller according to the embodiment of the present invention.
Figure 4:
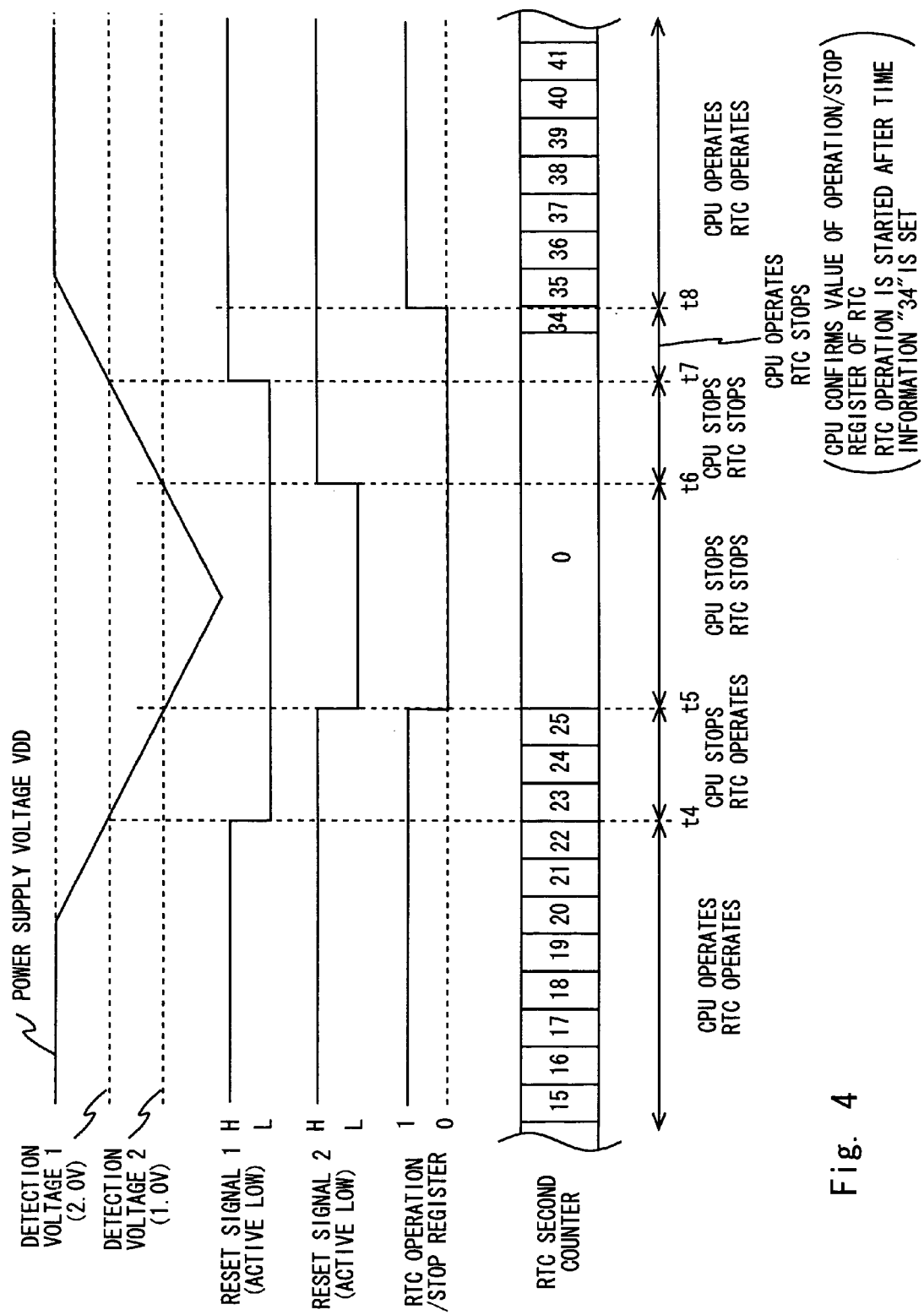
FIG. 4 shows an example of a timing chart of the microcontroller according to the embodiment of the present invention.

Next, with reference to timing charts of FIGS. 3 and 4, a description is given of operations of the microcontroller 100 of the first embodiment. FIG. 3 shows a case where the power supply voltage VDD becomes equal to or lower than the detection voltage 1 (for example, 2.0 V) but is not equal to or lower than the detection voltage 2 (for example, 1.0 V). FIG. 4 shows a case where the power supply voltage VDD becomes equal to or lower than the detection voltage 2 (for example, 1.0 V). Note that FIGS. 3 and 4 each show values of the second counter of the real-time clock 140. Normally, there are provided the minute counter, the hour counter, and the like as described above, but only the second counter is illustrated for simplification of the illustration. It is assumed that the values of the counter are used as time information by the CPU 130.

A description is given of operations of the microcontroller of the first embodiment with reference to the timing chart of FIG. 3. First, during a period prior to a time t1, it is assumed that the output voltage VDD of a battery, a capacitor, or the like gradually decreases for a certain period of time, but is equal to or higher than the detection voltage 1. The detection voltage 1 herein described is a voltage that allows the CPU 130 and the other peripheral functions 150 to operate as described above. In this case, the potential at the node A between the resistor elements R111 and R112 of the low-voltage detection circuit 110 is higher than an output potential of the reference voltage source 111, and thus the output of the comparator 112 becomes low level. As a result, the output of the inverter 113, that is, the reset signal 1 becomes high level, and the CPU and the other peripheral functions 150 perform normal operations.

Similarly, the potential at the node B between the resistor elements R121 and R122 of the low-voltage detection circuit 120 is higher than an output potential of the reference voltage source 121, and thus the output of the comparator 122 also becomes low level. As a result, the output of the inverter 123, that is, the reset signal 2 also becomes high level, and the real-time clock 140 performs a normal operation. Since the real-time clock 140 is not stopped, the value held by the operation/stop register 208 remains "1". Further, since the second counter is not stopped either, the count value normally increases. Then, the CPU 140 acquires the time information from the second counter of the real-time clock 140.

Next, during a period between the time t1 and a time t2, it is assumed that the power supply voltage VDD further decreases to be lower than the detection voltage 1, and it is also assumed that the power supply voltage VDD increases when a battery is charged or replaced, for example, but the power supply voltage VDD is equal to or lower than the detection voltage 1. Accordingly, during that period, the power supply voltage VDD is equal to or lower than the detection voltage 1 and is equal to or higher than the detection voltage 2. In this case, the potential at the node A of the low-voltage detection circuit 110 is lower than the output potential of the reference voltage source 111, and the output of the comparator 112 becomes high level. As a result, the output of the inverter 113, that is, the reset signal 1 becomes low level, and thus the CPU 130 and the other peripheral functions 150 are reset and deactivated.

In this case, as in the period prior to the time t1, the potential at the node B of the low-voltage detection circuit 120 is higher than the output potential of the reference voltage source 121, with the result that the output of the comparator 122 becomes low level. Accordingly, the output of the inverter 123, that is, the reset signal 2 also becomes high level, and the real-time clock 140 continues the normal operation. Since the real-time clock 140 is not stopped, the value held by the operation/stop register 208 remains "1". Further, since the second counter is not stopped, the count value continuously increases.

Next, during a period between the time t2 and a time t3, it is assumed that the power supply voltage VDD becomes higher than the detection voltage 1 again. In this case, the potential at the node A of the low-voltage detection circuit 110 is higher than the output potential of the reference voltage source 111, and the output of the comparator 112 becomes low level. As a result, the output of the inverter 113, that is, the reset signal 1 becomes high level, and the CPU 130 and the other peripheral functions 150 are released from a reset state, to thereby start operating. Basically, the other peripheral functions 150 start operating in response to the signal from the CPU 130.

The potential at the node B of the low-voltage detection circuit 120 is higher than the output potential of the reference voltage source 121, with the result that the output of the comparator 122 becomes low level. Accordingly, the output of the inverter 123, that is, the reset signal 2 also becomes high level, and the real-time clock 140 performs the normal operation. Since the real-time clock 140 is not stopped, the value held by the operation/stop register 208 remains "1", and the count value of the second counter increases.

In this case, the CPU 130 confirms whether the real-time clock 140 is operating and acquires the time information again because the CPU 130 is released from the reset condition. Thus, the CPU 130 reads the value of the operation/stop register 208. As described above, the value of the operation/stop register 208 remains "1" since the real-time clock 140 is not stopped during the period between the time t1 and the time t2. Accordingly, the CPU 130 confirms that the real-time clock 140 is operating, and then acquires the time information of the second counter.

After the time t3, it is assumed that the power supply voltage VDD is equal to or higher than the detection voltage 1, and the CPU 130 has already acquired the time information. Thus, during that period, an operation similar to that performed in the period prior to the time t1 is carried out. The microcontroller of the first embodiment performs the operations as described above with reference to the timing chart of FIG. 3.

Next, a description is given of operations of the microcontroller 100 of the first embodiment with reference to the timing chart of FIG. 4. First, during a period prior to a time t4, it is assumed that the power supply voltage VDD decreases but is equal to or higher than the detection voltage 1. In this case, the potential at the node A between the resistor elements R111 and R112 of the low-voltage detection circuit 110 is higher than the output potential of the reference voltage source 111. As a result, the output of the comparator 112 becomes low level. Accordingly, the output of the inverter 113, that is, the reset signal 1 becomes high level, and the CPU 130 and the other peripheral functions 150 perform the normal operations.

Similarly, the potential at the node B between the resistor elements R121 and R122 of the low-voltage detection circuit 120 is higher than the output potential of the reference voltage source 121. As a result, the output of the comparator 122 also becomes low level. Accordingly, the output of the inverter 123, that is, the reset signal 2 also becomes high level, and the real-time clock 140 performs the normal operation. Since the real-time clock 140 is not stopped, the value of the operation/stop register 208 remains "1". Further, since the second counter 202 is not stopped, the count value increases. Therefore, the CPU 130 acquires the time information from the second counter 202 of the real-time clock 140.

Next, during a period between the time t4 and a time t5, the power supply voltage VDD further decreases but is equal to or higher than the detection voltage 2. In this case, the potential at the node A of the low-voltage detection circuit 110 is lower than the output potential of the reference voltage source 111, and the output of the comparator 112 becomes high level. As a result, the output of the inverter 113, that is, the reset signal 1 becomes low level, and the CPU 130 and the other peripheral functions 150 are reset and deactivated.

In this case, as in the period prior to the time t1, the potential at the node B of the low-voltage detection circuit 120 is higher than the output potential of the reference voltage source 121. Accordingly, the output of the comparator 112 is low level. As a result, the output of the inverter 123, that is, the reset signal 2 also becomes high level, and the real-time clock 140 continues the normal operation. Since the real-time clock 140 is not stopped, the value of the operation/stop register 208 remains "1". Further, since the second counter 202 is not stopped, the count value continuously increases.

Next, during a period between the time t5 and a time t6, the power supply voltage VDD further decreases to be equal to or lower than the detection voltage 2. In this case, the potential at the node A of the low-voltage detection circuit 110 remains lower than the output potential of the reference voltage source 111, and the output of the comparator 112 is high level. As a result, the output of inverter 113, that is, the reset signal 1 becomes low level, and the operations of the CPU 130 and the other peripheral functions 150 are suspended.

In this case, the potential at the node B of the low-voltage detection circuit 120 is also lower than the output potential of the reference voltage source 121. Thus, the output of the comparator 122 becomes high level. As a result, the output of the inverter 123, that is, the reset signal 2 becomes low level, whereby the real-time clock 140 is reset and deactivated. Accordingly, the value of the operation/stop register 208 becomes "0", and the second counter 202 is also reset and the value of the counter also becomes "0".

Next, during a period between the time t6 and a time t7, the power supply voltage VDD increases to be equal to or higher than the detection voltage 2, but is equal to or lower than the detection voltage 1. In this case, the potential at the node A of the low-voltage detection circuit 110 remains lower than the output potential of the reference voltage source 111. Accordingly, the output of the comparator 112 is high level. As a result, the output of the inverter 113, that is, the reset signal 1 becomes low level, and the operations of the CPU 130 and the other peripheral functions 150 are suspended.

In this case, the potential at the node B of the low-voltage detection circuit 120 is higher than the output potential of the reference voltage source 121. Thus, the output of the comparator 122 becomes low level. As a result, the output of the inverter 123, that is, the reset signal 2 becomes high level, and the real-time clock 140 is in an operable state. Note that the CPU 130 is not released from the reset state as described above, so the time information is not set, and the value of the operation/stop register 208 remains "0". Accordingly, the sub-counter 2011 does not operate, and the value of the second counter 202 remains "0", with the result the real-time clock 140 remains in the operation stop state.

Next, during a period between the time t7 and a time t8, the power supply voltage VDD increases to be equal to or higher than the detection voltage 1. In this case, the potential at the node A of the low-voltage detection circuit 110 is higher than the output potential of the reference voltage source 111, and the output of the comparator 112 becomes low level. Accordingly, the output of the inverter 113, that is, the reset signal 1 becomes high level, and the CPU 130 and the other peripheral functions 150 are released from the reset state and start operating.

In this case, since the potential at the node B of the low-voltage detection circuit 120 is higher than the output potential of the reference voltage source 121, the output of the comparator 122 is low level. Accordingly, the output of the inverter 123, that is, the reset signal 2 also becomes high level, and the real-time clock 140 is in the operable state as in the period between the t6 and the time t7, but is still in the operation stop state.

The CPU 130 attempts to acquire the time information again because the CPU 130 is released from the reset state. Thus, the CPU 130 reads the value of the operation/stop register 208 to determine whether the real-time clock 140 is operating. As described above, since the real-time clock 140 is stopped during the period between the time t5 and the time t7, the value of the operation/stop register 208 remains "0". Accordingly, the CPU 130 confirms that the real-time clock 140 is not operating based on the numerical value. After that, the CPU 130 performs such processing as display of a message for a user to set the time information again on an external display, for example, to thereby acquire time set information. Then, based on the time set information thus obtained, the CPU 130 sets a counter value (sets a value of "34" in this embodiment) to the second counter 202 of the real-time clock 140. Further, the CPU 130 rewrites the value of the operation/stop register 208 from "0" to "1" to cause the sub-counter 2011 to operate, whereby the real-time clock 140 resumes the operation. After the time t8, operations similar to those executed during the period prior to the time t4 are carried out.

In a case where a device system having the microcontroller 100 of the first embodiment uses the real-time clock 140 based on a local time in the system, instead of using a current time (for example, using only a difference between values of the second counter 202 between certain times), it is unnecessary to set the time. Accordingly, at the time when the power supply voltage VDD is equal to or higher than the detection voltage 2, the real-time clock 140 may be allowed to operate.

The microcontroller of the first embodiment performs the operations as described above with reference to the timing chart of FIG. 4.

In addition, a description is given of a case where the power supply voltage VDD decreases to be equal or lower than an operation limit voltage (for example, 0.7 V or lower) of the reference voltage sources 111 and 121 that are formed of, for example, a regulator. Under such conditions, a predetermined voltage is not output from each of the reference voltage sources 111 and 121, with the result that the outputs of the comparators 112 and 122, which are compared with the voltages at the node A and the node B, respectively, and the reset signals 1 and 2 output by the inverter 113 and 123, respectively, can be inverted at the same time. In other words, the reset signals 1 and 2 can be set to high level. As a result, the CPU 130 and the like may be activated in the state where the power supply voltage VDD is reduced, which leads to runaway of the device.

However, in this case, the power supply voltage VDD is lower than the operation limit voltage of each of the CPU 130, the other peripheral functions 150, and the real-time clock 140, so the operations thereof are impossible. Further, in this case, the real-time clock 140 capable of normally operating at low voltage cannot operate because the quartz-crystal oscillator stops oscillating. In view of the above, it is apparent that there arises no problem even if the power supply voltage becomes equal to or lower than the operation limit voltage of each of the reference voltage sources 111 and 121 due to the drop in the power supply voltage VDD.

Figure 5:
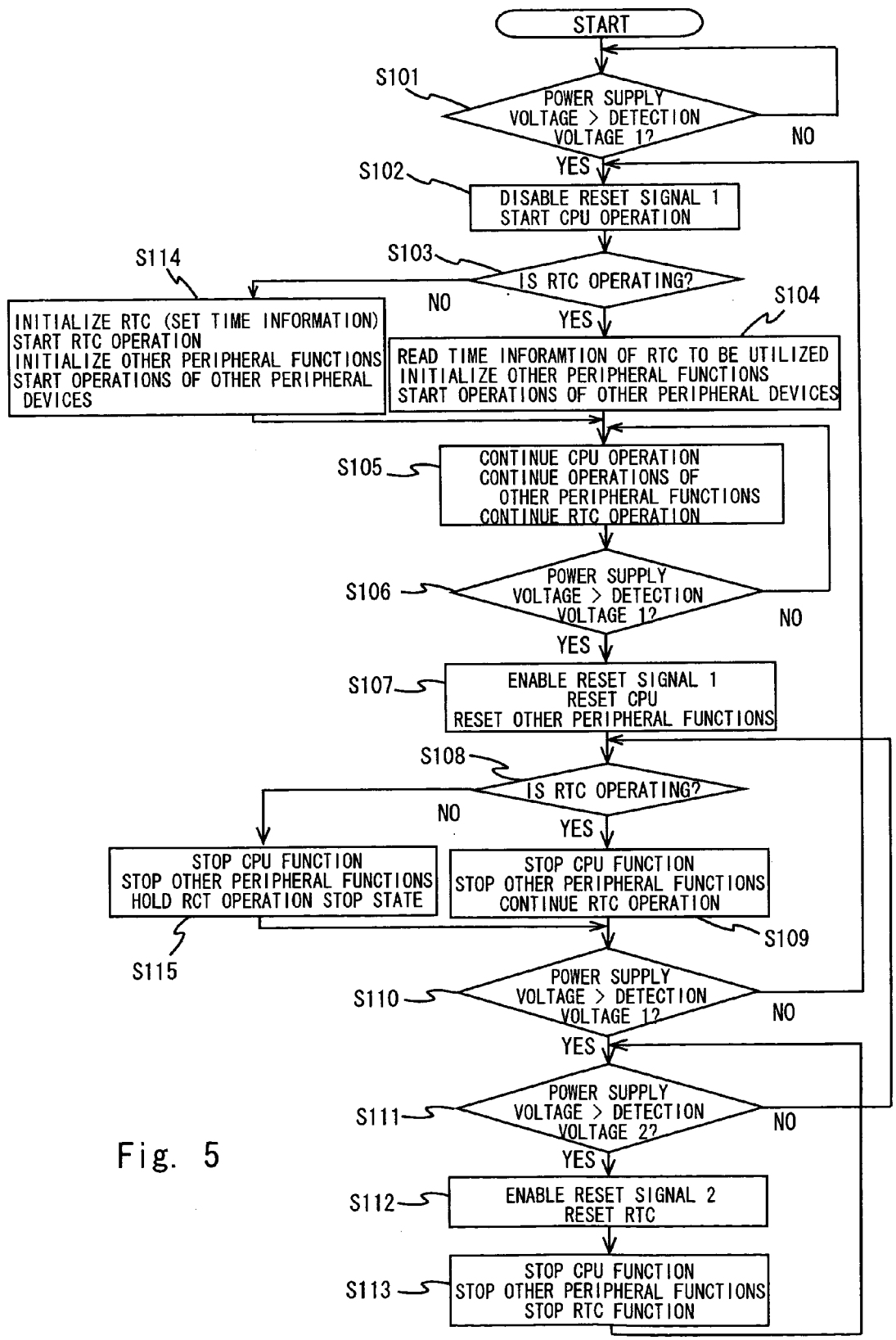
FIG. 5 shows an example of a flowchart of a sequence of operations executed by the microcontroller according to the embodiment of the present invention.
Figure 6:
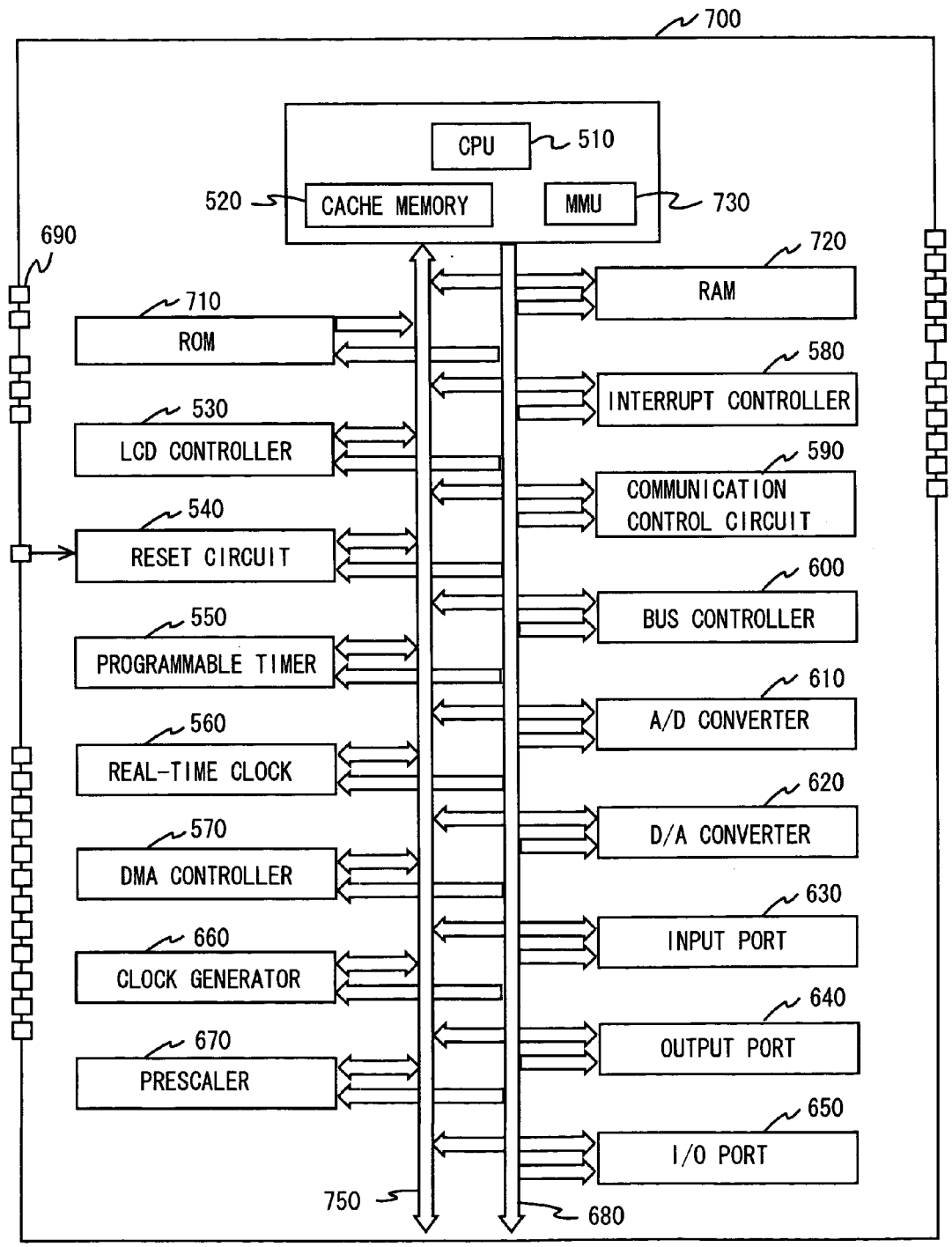
FIG. 6 shows an example of the configuration of a microcontroller according to prior art.

Next, FIG. 5 shows an operation processing procedure of the microcontroller 100 of the first embodiment including operation states shown in FIGS. 3 and 4.

First, the microcontroller 100 determines whether the power supply voltage VDD is higher than the detection voltage 1 (for example, 2.0 V) in the low-voltage detection circuit 110 (S101). Next, when it is determined that the power supply voltage VDD is lower than the detection voltage 1 in S101 (NO in S101), the process returns to S101.

On the other hand, when it is determined that the power supply voltage VDD is higher than the detection voltage 1 in S101 (YES in S101), the reset signal 1 is disabled, whereby the CPU 130 starts operating (S102). Subsequently, the CPU 130 reads the value held by the operation/stop register 208 of the real-time clock 140, and determines whether the real-time clock 140 is operating (S103).

Then, when it is determined that the real-time clock 140 is operating in S103 (YES in S103), the CPU 130 reads the time information of the counters of the real-time clock 140 to use the read time information for the processing. Further, the other peripheral functions 150 are initialized to start operating (S104). On the other hand, when it is determined that the real-time clock 140 is not operating in S103 (NO in S103), the real-time clock 140 is initialized (time information is set) to start operating. Further, the other peripheral functions 150 are initialized to start operating (S114). Then, the CPU 130, the other peripheral functions 150, and the real-time clock 140 are caused to continue operating (S105). Subsequently, it is determined whether the power supply voltage VDD is lower than the detection voltage 1 (for example, 2.0 V) in the low-voltage detection circuit 110 (S106). Then, when it is determined that the power supply voltage VDD is higher than the detection voltage 1 in S106 (NO in S106), the process returns to S105.

On the other hand, when it is determined that the power supply voltage VDD is higher than the detection voltage 1 in S106 (YES in S106), the reset signal 1 is enabled, whereby the CPU 130 and the other peripheral functions 150 are reset (S107).

Then, when the real-time clock 140 is operating (YES in S108), the CPU 130 and the other peripheral functions 150 are maintained in a function stop state, and the real-time clock 140 is maintained in the operation state (S109). On the other hand, when the real-time clock 140 is not operating (NO in S108), the CPU 130, the other peripheral functions 150, and the real-time clock 140 are maintained in the function stop state (S115). Subsequently, it is determined whether the power supply voltage VDD is lower than the detection voltage 1 in the low-voltage detection circuit 110 (S110). Then, when it is determined that the power supply voltage VDD is higher than the detection voltage 1 in S110 (NO in S110), the process returns to S102.

On the other hand, it is determined that the power supply voltage VDD is lower than the detection voltage 2 in S110 (YES in S110), it is determined whether the power supply voltage VDD is lower than the detection voltage 2 in the low-voltage detection circuit 120 (S111). After that, when it is determined that the power supply voltage VDD is higher than the detection voltage 2 in S111 (NO in S111), the process returns to S108.

On the other hand, when it is determined that the power supply voltage VDD is lower than the detection voltage 2 in S111 (YES in S111), the reset signal 2 is enabled, whereby the real-time clock 140 is reset (S112). Then, the CPU 130, the other peripheral functions 150, and the real-time clock 140 are maintained in the function stop state (S113). After that, the process returns to S111. As described above, the operation processing procedure of the microcontroller 100 is carried out.

As described above, the microcontroller 100 according to the embodiment of the present invention has the following effects. The conventional microcontroller is designed focusing on the CPU. Accordingly, in order to prevent the runaway of the microcontroller due to the drop in power supply voltage, all the functions (real-time clock and the like) mounted on a single chip are reset with the minimum operation limit voltage of the CPU being used as a reference. As a result, all the operations including the function of the real-time clock, which is formed on the same chip and operates at a voltage lower than that for operating the CPU, are stopped each time the power supply voltage becomes the minimum operation limit voltage of the CPU. Therefore, a user is forced to perform such an operation as setting of time information, which impairs the convenience of the product.

The microcontroller 100 according to the embodiment of the present invention resets the functions such as the CPU, which are mounted on the same chip but operate at a relatively high minimum operation guarantee voltage, at the detection voltage 1 in response to the reset signal 1. Then, the microcontroller resets the functions such as the real-time clock, which operate at a relatively low minimum operation guarantee voltage, at the detection voltage 2 in response to the reset signal 2. As a result, even if the power supply voltage such as a battery drops and the CPU or the like is reset, the real-time clock can operate until the power supply voltage further decreases. Thus, it is unnecessary to set the time information when the CPU is reset. Therefore, the microcontroller can be realized with a single chip without impairing the user-friendliness, with the result that manufacturing costs and the like are prevented from increasing.

Note that the present invention is not limited to the above embodiment, but can be appropriately modified without departing from the scope and spirit of the present invention. Accordingly, as the function that is not reset until the power supply voltage becomes the detection voltage 2, any function other than the real-time clock may also be employed. In other words, the present invention can be applied to any microcontroller which includes at least two voltage detection circuits that are formed on a single chip and have functions for detecting a power supply voltage by using different detection voltages (detection voltages 1 and 2 in the above embodiment) to output reset signals. For example, in the above embodiment, as the function controlled by the reset signal 2, the real-time clock is described. In place of the real-time clock, there can be employed a clock output circuit for supplying a clock to an external IC or for outputting a buzzer to a piezoelectric buzzer. In this case, even if the power supply voltage VDD drops and the CPU is reset in response to the reset signal 1, for example, the clock output circuit is not reset in response to the reset signal 1 but operates continuously. As a result, a clock output of the clock output circuit is used as a buzzer output, and a function capable of notifying a user of a voltage drop by using buzzer can be realized with a one-chip microcontroller.

It is apparent that the present invention is not limited to the above embodiments, but may be modified and changed without departing from the scope and spirit of the invention.

What is claimed is:

1. A microcontroller, comprising:
 a first low-voltage detection circuit to detect that a power supply voltage is equal to or lower than a first voltage value;
 a second low-voltage detection circuit to detect that the power supply voltage is equal to or lower than a second voltage value, the second voltage value being lower than the first voltage value;
 a central processing unit (CPU) to stop operating when the first low-voltage detection circuit detects that the power supply voltage is equal to or lower than the first voltage value;
 a real-time clock to continue operating unless the second low-voltage detection circuit detects that the power supply voltage is equal to or lower than the second voltage value; and
 a memory circuit that stores a program for use in processing by the CPU,
 wherein the first low-voltage detection circuit, the second low-voltage detection circuit, the CPU, the real-time clock, and the memory circuit are formed on a single chip,
 wherein the CPU performs processing within the microcontroller according to the program stored in the memory circuit,
 wherein the real-time clock includes;
  an oscillation circuit to receive an output of an oscillator to generate a clock signal for a clock;
  a clock counter to perform a count operation based on the clock signal for the clock; and
  a memory unit, and
 wherein the memory unit stores a first value set when the CPU sets time information to the clock counter, and the memory unit stores a second value set when the second low-voltage detection circuit detects that the power voltage is to or lower than the second voltage value.

2. The microcontroller according to claim 1, wherein the real-time clock stops operating when the second low voltage detection circuit detects that the power supply voltage is equal to or lower than the second voltage value.

3. The microcontroller according to claim 1, wherein the first low-voltage detection circuit outputs a signal to cause the CPU to stop operating when the first low-voltage detection circuit detects that the power supply voltage is equal to or lower than the first voltage value.

4. The microcontroller according to claim 3, wherein the second low-voltage detection circuit outputs a signal to cause the real-time clock to stop operating when the second low-voltage detection circuit detects that the power supply voltage is equal to or lower than the second voltage value.

5. The microcontroller according to claim 1, wherein the second voltage value is a minimum operation guarantee voltage of the real-time clock.

6. The microcontroller according to claim 5, wherein the minimum operation guarantee voltage of the real-time clock is a limit voltage enabling a logic circuit to operate.

7. The microcontroller according to claim 1, wherein the first voltage value comprises a minimum operation guarantee voltage of the CPU.

8. The microcontroller according to claim 7, wherein the minimum operation guarantee voltage of the CPU comprises a voltage necessary for a communication between the CPU and a nonvolatile memory.

9. The microcontroller according to claim 1, wherein the first low-voltage detection circuit includes:
 a first reference voltage source; and
 a first comparator to generate a signal to cause the CPU to stop operating, in accordance with a voltage output from the first reference voltage source and a voltage generated based on the first voltage value.

10. The microcontroller according to claim 1, wherein the second low-voltage detection circuit includes:
 a second reference voltage source; and
 a second comparator to generate a signal to cause the real-time clock to stop operating, in accordance with a voltage output from the second reference voltage source and a voltage generated based on the second voltage value.

11. A control method for a microcontroller, the microcontroller including: a central processing unit (CPU); a clock unit; and a memory unit to store information indicative of an operation state of the clock unit, which are formed on a single chip, the method comprising:
 setting time information to the clock unit and setting a first value to the memory unit;
 detecting whether a power supply voltage is equal to or lower than a first voltage value;
 detecting whether the power supply voltage is equal to or lower than a second voltage value, the second voltage value being lower than the first voltage value;
 causing the CPU to stop operating and causing the clock unit to continue operating when the power supply voltage is detected to be equal to or lower than the first voltage value; and
 setting a second value to the memory unit when the power supply voltage is detected to be equal to or lower than the second voltage value.

12. The control method for a microcontroller according to claim 11, wherein the setting the second value comprises causing the clock unit to stop operating.

13. The control method for a microcontroller according to claim 11, further comprising reading a value stored in the memory unit when the power supply voltage becomes higher than the first voltage value again after the causing the CPU to stop operating and causing the clock unit to continue operating.

14. The control method for a microcontroller according to claim 13, wherein the time information is prevented from being newly set to the clock unit when the read value stored in the memory unit is equal to the first value.

15. The control method for a microcontroller according to claim 13, wherein the time information is newly set to the clock unit when the read value stored in the memory unit is equal to the second value.

16. A microcontroller, comprising:
a first low-voltage detection circuit to detect that a power supply voltage is equal to or lower than a first voltage value;
a second low-voltage detection circuit to detect that the power supply voltage is equal to or lower than a second voltage value, the second voltage value being lower than the first voltage value;
a central processing unit (CPU) to stop operating when the first low-voltage detection circuit detects that the power supply voltage is equal to or lower than the first voltage value;
a real-time clock to continue operating unless the second low-voltage detection circuit detects that the power supply voltage is equal to or lower than the second voltage value;
a memory circuit that stores a program for use in processing by the CPU; and
a first resistor and a second resistor connected in parallel with the first low-voltage detection circuit,
wherein the first low-voltage detection circuit, the second low-voltage detection circuit, the CPU, the real-time clock, and the memory circuit are formed on a single chip, and
wherein the CPU performs processing within the microcontroller according to the program stored in the memory circuit.

17. A microcontroller, comprising:
a first low-voltage detection circuit to detect that a power supply voltage is equal to or lower than a first voltage value;
a second low-voltage detection circuit to detect that the power supply voltage is equal to or lower than a second voltage value, the second voltage value being lower than the first voltage value;
a central processing (CPU) to stop operating when the first low-voltage detection circuit detects that the power supply voltage is equal to or lower than the first voltage value;
a real-time clock to continue operating unless the second low-voltage detection circuit detects that the power supply voltage is equal to or lower than the second voltage value;
a memory circuit that stores a program for use in processing by the CPU; and
a comparator that receives a signal from the second low-voltage detection circuit, and outputs a second signal to the real-time clock,
wherein the first low-voltage detection circuit, the second low-voltage detection circuit, the CPU the real-time clock, and the memory circuit are formed on a single chip,
wherein the CPU performs processing within the microcontroller according to the program stored in the memory circuit, and
wherein the second signal is inverted prior to being received by the real-time clock.

* * * * *